United States Patent
Zhou

(10) Patent No.: US 10,882,984 B2
(45) Date of Patent: Jan. 5, 2021

(54) VISCOELASTIC MUD AND PREPARATION METHOD THEREOF

(71) Applicant: Guangxi Sisland Industrial Co. Ltd, Wuzhou (CN)

(72) Inventor: Yueliu Zhou, Wuzhou (CN)

(73) Assignee: Guangxi Sisland Industrial Co. Ltd, Wuzhou (CN)

( * ) Notice: Subject to any disclaimer, the term of this patent is extended or adjusted under 35 U.S.C. 154(b) by 99 days.

(21) Appl. No.: 16/207,000

(22) Filed: Nov. 30, 2018

(65) Prior Publication Data

US 2020/0062935 A1 Feb. 27, 2020

(30) Foreign Application Priority Data

Aug. 21, 2018 (CN) .......................... 2018 1 0953709

(51) Int. Cl.

| | |
|---|---|
| *C08L 91/00* | (2006.01) |
| *C08L 9/00* | (2006.01) |
| *C08L 9/06* | (2006.01) |
| *C08L 9/02* | (2006.01) |
| *A23G 4/06* | (2006.01) |
| *C08L 9/10* | (2006.01) |

(52) U.S. Cl.
CPC .................. *C08L 9/10* (2013.01); *A23G 4/06* (2013.01); *C08L 9/00* (2013.01); *C08L 9/02* (2013.01); *C08L 9/06* (2013.01); *C08L 91/00* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 4,187,320 | A | * | 2/1980 | Koch ....................... A23G 4/00 426/3 |
| 4,942,270 | A | * | 7/1990 | Gamarra .................. C08K 5/01 174/77 R |
| 2004/0243042 | A1 | * | 12/2004 | Lipman ................. A61F 13/023 602/43 |

FOREIGN PATENT DOCUMENTS

| | | | |
|---|---|---|---|
| CN | 101959701 A | | 1/2011 |
| CN | 102660219 A | | 9/2012 |
| CN | 102690451 A | | 9/2012 |
| CN | 106147048 A | * | 11/2016 |
| CN | 107641283 A | | 1/2018 |
| JP | 11333932 A | * | 12/1999 |
| RU | 2036936 C1 | | 6/1995 |
| WO | WO-9305113 A1 | * | 3/1993 ............... H01R 4/70 |

OTHER PUBLICATIONS

Machine translation of CN 106147048 A, retrieved May 2020 (Year: 2020).*
China Office Action dated Dec. 2, 2019 for corresponding China application No. 201810953709.1 pp. 1-9.
"Plastic Formula Handbook", China Light Industry Press, 1995, p. 462, with English abstract (4 pages).

* cited by examiner

*Primary Examiner* — Nicole M. Buie-Hatcher
(74) *Attorney, Agent, or Firm* — Intellectual Property Law Group LLP

(57) ABSTRACT

The present disclosure relates to a viscoelastic mud and a preparation method thereof. The viscoelastic mud is produced from raw materials including, by weight percent, 4% to 20% of elastomer, 0% to 40% of softening oil, and 40% to 96% of liquid rubber. The elastomer is at least one selected from the group consisting of styrenic block copolymer and semi-solid polyisobutylene rubber.

10 Claims, 1 Drawing Sheet

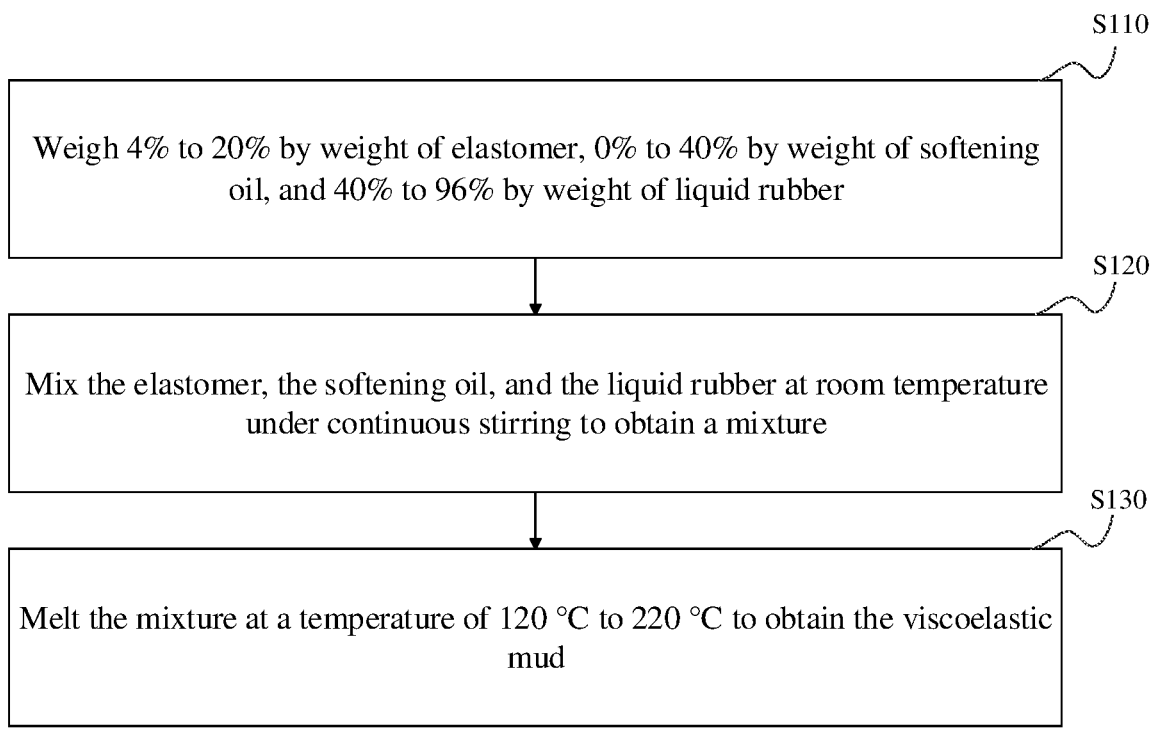

VISCOELASTIC MUD AND PREPARATION METHOD THEREOF

CROSS REFERENCE TO RELATED APPLICATIONS

This application claims priority under 35 U.S.C. § 119 to Chinese Patent Application No. 201810953709.1, filed on Aug. 21, 2018, the entire content of which is incorporated herein in its entirety.

TECHNICAL FIELD

The present disclosure relates to a viscoelastic mud and a preparation method thereof.

BACKGROUND

Conventionally used semi-solid muddy gels are usually plasticine, wax mud, mineral mud, and the like, which have poor viscosity and rebound rate and lack tensile strength, thereby limiting their application.

SUMMARY

According to various embodiments of the present disclosure, a viscoelastic mud and a preparation method thereof are provided.

A viscoelastic mud is produced from raw materials including, by weight percent, 4% to 20% of elastomer, 0% to 40% of softening oil, and 40% to 96% of liquid rubber. The elastomer is at least one selected from the group consisting of styrenic block copolymer and semi-solid polyisobutylene rubber.

A method of preparing a viscoelastic mud includes:

weighing 4% to 20% by weight of elastomer, 0% to 40% by weight of softening oil, and 40% to 96% by weight of liquid rubber; the elastomer is at least one selected from the group consisting of styrenic block copolymer and semi-solid polyisobutylene rubber; mixing the elastomer, the softening oil, and the liquid rubber at room temperature under continuous stirring to obtain a mixture; and melting the mixture at a temperature of about 120° C. to about 220° C. to obtain the viscoelastic mud.

A viscoelastic article made of the foregoing viscoelastic mud is also provided.

The above and other features of the invention including various novel details of construction and combinations of parts, and other advantages, will now be more particularly described with reference to the accompanying drawings and pointed out in the claims.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawing:

The FIGURE is a flowchart of a method of preparing a viscoelastic mud according to an embodiment.

DETAILED DESCRIPTION OF THE EMBODIMENTS

The above objects, features and advantages of the present invention will become more apparent by describing in detail embodiments thereof with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A viscoelastic mud according to an embodiment is a semi-solid muddy gel which has both suitable viscosity and rebound rate, and has good tensile strength. The raw materials for preparing the viscoelastic mud include: by weight percent, 4% to 20% of elastomer, 0% to 40% of softening oil, and 40% to 96% of liquid rubber. The aforementioned viscoelastic mud is obtained by mixing the raw materials and then heating and melting.

The elastomer is in a form of particle or powder or amorphous block. The elastomer is at least one selected from the group consisting of styrenic block copolymer and semi-solid polyisobutylene rubber. Specifically, styrenic block copolymers (SBCs) are thermoplastic elastomers. Specifically, the styrenic block copolymer is at least one selected from the group consisting of styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS), and hydrogenated styrene-butadiene-isoprene-styrene block copolymer (SEEPS). The semi-solid polyisobutylene rubber is a polyisobutylene having a molecular weight of greater than 40,000, such as the Oppanol B 12N and Oppanol B100 semi-solid polyisobutylene rubber of BASF Corporation of Germany. The liquid polyisobutylene rubber refers to a liquid polyisobutylene rubber having a molecular weight of less than 10,000, such as Glissopal 1300 and Glissopal 2300 from BASF Corporation of Germany.

In addition, the elastomer is styrene-ethylene-propylene-styrene block copolymer (SEPS) or the semi-solid polyisobutylene rubber. SEPS has a better tenacity, is softer in material, and has a higher elasticity after absorbing the softening oil and the liquid rubber. The semi-solid polyisobutylene rubber has strong stretchability and elasticity, and can still exhibit suitable tensile strength and rebound rate after absorbing the softening oil and the liquid rubber.

The softening oil can be compatible with the styrenic block copolymer and the semi-solid polyisobutylene rubber, and can be absorbed and fused by the styrenic block copolymer or the semi-solid polyisobutylene rubber at room temperature. Specifically, the softening oil is at least one selected from the group consisting of paraffin oil and naphthenic oil. The aforementioned softening oil has a good compatibility with the styrenic block copolymer and the semi-solid polyisobutylene rubber at room temperature and is relatively easily absorbed by the styrenic block copolymer or the semi-solid polyisobutylene rubber. In addition, the softening oil is naphthenic oil. Since naphthenic oil is mainly composed of cycloalkanes and contains a saturated cyclic carbon chain structure, such structure determines that the compatibility of the naphthenic oil with the styrenic block copolymer or the semi-solid polyisobutylene rubber is higher than that of the paraffin oil, and the softening effect is more remarkable. When heated and melted together with the elastomer, the flowability is higher and the plasticization is easier. After the high-temperature plasticization, the naphthenic oil and the elastomer are combined together are not easily separated.

The liquid rubber is a liquid rubber which can be compatible with the styrenic block copolymer or the semi-solid polyisobutylene rubber, and can be absorbed and fused by the styrenic block copolymer or the semi-solid polyisobutylene rubber at room temperature. Specifically, the liquid rubber is at least one selected from the group consisting of diene rubber and liquid polyisobutylene rubber. The aforementioned liquid rubber can be well compatible with the styrenic block copolymer or the semi-solid polyisobutylene rubber at room temperature and is more easily absorbed by the styrenic block copolymer or the semi-solid polyisobutylene rubber. In addition, after high-temperature plasticization with the styrenic block copolymer or the semi-solid polyisobutylene rubber, the liquid rubber and the elastomer are combined together and are not easily separated. In one embodiment, the diene rubber is at least one selected from the group consisting of nitrile butadiene rubber, styrene butadiene rubber, butadiene rubber, isoprene rubber, and butyl rubber.

In addition, the liquid rubber is butadiene rubber. Such rubber is capable of being rapidly absorbed by the styrenic block copolymer or the semi-solid polyisobutylene rubber at room temperature and can be fused with the styrenic block copolymer or the semi-solid polyisobutylene rubber.

Moreover, the raw materials for preparing the viscoelastic mud include: by weight percent, 8% to 15% of elastomer, 15% to 30% of softening oil, and 55% to 77% of liquid rubber.

Furthermore, the styrene block copolymer is styrene-ethylene-propylene-styrene block copolymer (SEPS) or the semi-solid polyisobutylene rubber, the softening oil is naphthenic oil, and the liquid rubber is butadiene rubber.

In one embodiment, the raw materials for preparing the viscoelastic mud consist of: by weight percent, 4% to 20% of elastomer, 0% to 40% of softening oil, and 40% to 96% of liquid rubber. In addition, the raw materials for preparing the viscoelastic mud consist of: by weight percent, 8% to 15% of elastomer, 15% to 30% of softening oil, and 55% to 77% of liquid rubber.

The aforementioned viscoelastic mud has at least the following advantages:

Since the styrenic block copolymer and the semi-solid polyisobutylene rubber are thermoplastic elastomers, the elasticity and tensile strength of the conventional rubber can be obtained without chemical vulcanization reaction, the viscosity of the liquid rubber and the dissolving ability to the styrenic block copolymer and the semi-solid polyisobutylene rubber elastomer can be assisted to make the viscosity moderately. It has been experimentally proved that the aforementioned viscoelastic mud not only has a suitable viscosity and rebound rate, but also has a good tensile strength. The viscoelastic mud has suitable viscosity and stretchability, which can enwrap a large volume of filler and firmly enwrap the filler. The viscoelastic mud has more application functions, such as enwrapping sugar granule and sugar powder as food, coating starch, calcium carbonate, silicon dioxide, talcum powder, silicone oil, glass microbeads or foamed microcapsules as shaping mud and fitness mud.

Referring to the FIGURE, a method of preparing a viscoelastic mud according to an embodiment includes:

In step S110, 4% to 20% by weight of elastomer, 0% to 40% by weight of softening oil, and 40% to 96% by weight of liquid rubber are weighed.

The elastomer is in a form of particle or powder or amorphous block. The elastomer is at least one selected from the group consisting of styrenic block copolymer and semi-solid polyisobutylene rubber. Specifically, the styrenic block copolymer is at least one selected from the group consisting of styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS), and hydrogenated styrene-butadiene-isoprene-styrene block copolymer (SEEPS). In addition, the elastomer is styrene-ethylene-propylene-styrene block copolymer (SEPS) or the semi-solid polyisobutylene rubber.

The softening oil can be compatible with the styrenic block copolymer and the semi-solid polyisobutylene rubber, and can be absorbed and fused by the styrenic block copolymer or the semi-solid polyisobutylene rubber at room temperature. Specifically, the softening oil is at least one selected from the group consisting of paraffin oil and naphthenic oil. In addition, the softening oil is naphthenic oil.

The liquid rubber is a liquid rubber which can be compatible with the styrenic block copolymer or the semi-solid polyisobutylene rubber, and can be absorbed and fused by the styrenic block copolymer or the semi-solid polyisobutylene rubber at room temperature. Specifically, the liquid rubber is at least one selected from the group consisting of diene rubber and liquid polyisobutylene rubber. In one embodiment, the diene rubber is at least one selected from the group consisting of nitrile butadiene rubber, styrene butadiene rubber, butadiene rubber, isoprene rubber, and butyl rubber. In addition, the liquid rubber is butadiene rubber.

Moreover, the raw materials for preparing the viscoelastic mud include: by weight percent, 8% to 15% of elastomer, 15% to 30% of softening oil, and 55% to 77% of liquid rubber.

Furthermore, the styrene block copolymer is styrene-ethylene-propylene-styrene block copolymer (SEPS) or the semi-solid polyisobutylene rubber, the softening oil is naphthenic oil, and the liquid rubber is butadiene rubber.

In one embodiment, the raw materials for preparing the viscoelastic mud consist of: by weight percent, 4% to 20% of elastomer, 0% to 40% of softening oil, and 40% to 96% of liquid rubber. In addition, the raw materials for preparing the viscoelastic mud consist of: by weight percent, 8% to 15% of elastomer, 15% to 30% of softening oil, and 55% to 77% of liquid rubber.

In step S120: the elastomer, the softening oil, and the liquid rubber are mixed at room temperature under continuous stirring to obtain a mixture.

It should be noted that the room temperature referred herein refers to about −10° C. to about 40° C.

In one embodiment, the step S120 includes: the softening oil and the liquid rubber are uniformly mixed under room temperature and continuous stirring, and then the elastomer is added to continuously mix for about 15 min to about 60 min, such that the softening oil is absorbed by the elastomer.

In another embodiment, the step S120 includes: the softening oil and the elastomer are mixed for about 15 min to about 60 min under room temperature and continuous stirring to allow the elastomer to absorb the softening oil, and then the liquid rubber is added to continuously mix for about 15 min to about 60 min.

In yet another embodiment, the step S120 includes: the liquid rubber and the elastomer are mixed for about 15 min to about 60 min under room temperature and continuous stirring, and then the softening oil is added to continuously mix for about 15 min to about 60 min, such that the softening oil is absorbed by the elastomer.

In step S130, the mixture are melted at a temperature of about 120° C. to about 220° C. to obtain the viscoelastic mud.

Specifically, the melting step can be carried out in an oil furnace, a kneader, an internal mixer, an extruder or an injection molding machine.

The aforementioned method of preparing the viscoelastic mud has the advantages of simple operation and is easy for industrial production, and the prepared viscoelastic mud not only has suitable viscosity and rebound rate, but also has good tensile strength.

The aforementioned viscoelastic mud can be used as a gum base for foods. For example, the food is chewing gum. The aforementioned viscoelastic mud can be used for the inclusion of sugar granule and sugar powder.

The aforementioned viscoelastic mud can also be used as a glue base for a seaming glue, which can enter various corners of the gap to fill the internal space of the gap.

The aforementioned viscoelastic mud can also be used as a fitness gel. The viscoelastic mud can be used for hand-pulling and hand-holding fitness materials due to its strong tensile strength and resilience performance, thereby strengthening the body.

The aforementioned viscoelastic mud can also be used as a rubber base for shaping mud for enwrapping starch, calcium carbonate, silicon dioxide, talcum powder, silicone oil, glass microbeads or foamed microcapsules. The aforementioned viscoelastic mud can also be used as a creative material for toys and handicrafts.

The aforementioned viscoelastic mud can also be used as a filler for a waterproof bag since it does not absorb water and is insoluble in water.

The following are specific examples (unless otherwise specified, the following examples do not contain other unspecified components other than unavoidable impurities):

Example 1 and Examples 10 to 22

A process of preparing a viscoelastic mud of Example 1 and Examples 10-22 is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the elastomer was added to continuously mix for 35 min to obtain a mixture.

(3) The mixture was melted at a temperature of 160° C. for 3 hours, and then cooled to obtain the viscoelastic mud.

TABLE 1

| | Elastomer | | Softening oil | | Liquid rubber | |
|---|---|---|---|---|---|---|
| | Substance | Content (%) | Substance | Content (%) | Substance | Content (%) |
| Example 1 | SIS | 20 | naphthenic oil | 40 | liquid polyisobutylene rubber | 40 |
| Example 2 | SEPS | 8 | naphthenic oil | 15 | butadiene rubber | 77 |
| Example 3 | SEPS | 15 | naphthenic oil | 30 | butadiene rubber | 55 |
| Example 4 | SEPS | 12 | naphthenic oil | 26 | butadiene rubber | 62 |
| Example 5 | semi-solid polyisobutylene rubber | 8 | naphthenic oil | 15 | butadiene rubber | 77 |
| Example 6 | semi-solid polyisobutylene rubber | 15 | naphthenic oil | 30 | butadiene rubber | 55 |
| Example 7 | semi-solid polyisobutylene rubber | 10 | naphthenic oil | 22 | butadiene rubber | 68 |
| Example 8 | SEPS | 6 | naphthenic oil | 36 | nitrile butadiene rubber | 58 |
| Example 9 | SBS | 12 | paraffin oil | 12 | isoprene rubber | 76 |
| Example 10 | SIS | 10 | paraffin oil and naphthenic oil in a mass ratio of 30:70 | 40 | nitrile butadiene rubber | 50 |
| Example 11 | SEBS | 11 | paraffin oil | 7 | isoprene rubber | 82 |
| Example 12 | SEEPS | 8 | paraffin oil | 25 | butadiene rubber | 67 |
| Example 13 | semi-solid polyisobutylene rubber and SEPS in a mass ratio of 75:25 | 18 | naphthenic oil | 5 | butyl rubber | 77 |

TABLE 1-continued

| | Elastomer | | Softening oil | | Liquid rubber | |
|---|---|---|---|---|---|---|
| | Substance | Content (%) | Substance | Content (%) | Substance | Content (%) |
| Example 14 | SEBS and SEPS in a mass ratio of 40:60 | 4 | paraffin oil | 20 | styrene butadiene rubber | 76 |
| Example 15 | SEPS semi-solid polyisobutylene rubber and SEPS in a mass ratio of 15:85 | 5 | paraffin oil | 35 | butadiene rubber | 60 |
| Example 16 | SBS, SEEPS, and SIS in a mass ratio of 20:60:20 | 16 | paraffin oil and naphthenic oil in a mass ratio of 70:30 | 18 | butadiene rubber, isoprene rubber, and butyl rubber in a mass ratio of 50:30:20 | 66 |
| Example 17 | semi-solid polyisobutylene rubber, SBS, and SEPS in a mass ratio of 65:15:20 | 20 | paraffin oil | 28 | liquid polyisobutylene rubber and butyl rubber in a mass ratio of 85:15 | 52 |
| Example 18 | SEPS | 10 | — | 0 | liquid polyisobutylene rubber | 90 |
| Example 19 | SBS and semi-solid polyisobutylene rubber in a mass ratio of 30:70 | 20 | — | 0 | butadiene rubber and nitrile butadiene rubber in a mass ratio of 35:65 | 80 |
| Example 20 | SEEPS | 4 | — | 0 | butadiene rubber | 96 |
| Example 21 | SBS, SEEPS, and SIS in a mass ratio of 30:45:25 | 15 | — | 0 | butadiene rubber, isoprene rubber, and nitrile butadiene rubber in a mass ratio of 45:35:20 | 85 |
| Example 22 | SEPS | 18 | — | 0 | nitrile butadiene rubber | 82 |
| Comparative Example 1 | SEBS | 2 | — | 0 | styrene butadiene rubber | 98 |
| Comparative Example 2 | SIS | 10 | naphthenic oil | 50 | butyl rubber | 40 |
| Comparative Example 3 | SIS | 30 | naphthenic oil | 40 | liquid polyisobutylene rubber | 30 |

Example 2

A process of preparing a viscoelastic mud of the present embodiment is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the elastomer was added to continuously mix for 15 min to obtain a mixture.

(3) The mixture was melted at a temperature of 120° C. for 6 hours, and then cooled to obtain the viscoelastic mud.

Example 3

A process of preparing a viscoelastic mud of the present embodiment is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the elastomer was added to continuously mix for 60 min to obtain a mixture.

(3) The mixture was melted at a temperature of 220° C. for 1 hour, and then cooled to obtain the viscoelastic mud.

Example 4

A process of preparing a viscoelastic mud of the present embodiment is described as follows:

(1) Each component was weighed in accordance with Table 1 to obtain the raw materials. The content in Table 1 represented a weight percentage of each of the components.

(2) The softening oil and the elastomer were mixed for 20 min under room temperature and continuous stirring, and then the liquid rubber was added to continuously mix for 25 min to obtain a mixture.

(3) The mixture was melted at a temperature of 160° C. for 3 hours, and then cooled to obtain the viscoelastic mud.

Example 5

A process of preparing a viscoelastic mud of the present embodiment is described as follows:

(1) Each component was weighed in accordance with Table 1 to obtain the raw materials. The content in Table 1 represented a weight percentage of each of the components.

(2) The softening oil and the elastomer were mixed for 15 min under room temperature and continuous stirring, and then the liquid rubber was added to continuously mix for 60 min to obtain a mixture.

(3) The mixture was melted at a temperature of 120° C. for 7 hours, and then cooled to obtain the viscoelastic mud.

Example 6

A process of preparing a viscoelastic mud of the present embodiment is described as follows:

(1) Each component was weighed in accordance with Table 1 to obtain the raw materials. The content in Table 1 represented a weight percentage of each of the components.

(2) The softening oil and the elastomer were mixed for 60 min under room temperature and continuous stirring, and then the liquid rubber was added to continuously mix for 15 min to obtain a mixture.

(3) The mixture was melted at a temperature of 220° C. for 2 hours, and then cooled to obtain the viscoelastic mud.

Example 7

A process of preparing a viscoelastic mud of the present embodiment is described as follows:

(1) Each component was weighed in accordance with Table 1 to obtain the raw materials. The content in Table 1 represented a weight percentage of each of the components.

(2) The liquid rubber and the elastomer were mixed for 30 min under room temperature and continuous stirring, and then the softening oil was added to continuously mix for 15 min to obtain a mixture.

(3) The mixture was melted at a temperature of 160° C. for 5 hours, and then cooled to obtain the viscoelastic mud.

Example 8

A process of preparing a viscoelastic mud of the present embodiment is described as follows:

(1) Each component was weighed in accordance with Table 1 to obtain the raw materials. The content in Table 1 represented a weight percentage of each of the components.

(2) The liquid rubber and the elastomer were mixed for 60 min under room temperature and continuous stirring, and then the softening oil was added to continuously mix for 15 min to obtain a mixture.

(3) The mixture was melted at a temperature of 120° C. for 6 hours, and then cooled to obtain the viscoelastic mud.

Example 9

A process of preparing a viscoelastic mud of the present embodiment is described as follows:

(1) Each component was weighed in accordance with Table 1 to obtain the raw materials. The content in Table 1 represented a weight percentage of each of the components.

(2) The liquid rubber and the elastomer were mixed for 15 min under room temperature and continuous stirring, and then the softening oil was added to continuously mix for 60 min to obtain a mixture.

(3) The mixture was melted at a temperature of 220° C. for 1 hour, and then cooled to obtain the viscoelastic mud.

Comparative Examples 1 to 3

The preparation process of the viscoelastic mud of Comparative Examples 1 to 3 was substantially the same as that of Example 1, except that the components and the weight percentages of the raw materials were different. The components and the weight percentages thereof of the raw materials of the viscoelastic mud of Comparative Examples 1 to 3 were shown in Table 1.

Test:

The aforementioned applications of the viscoelastic mud are mainly accomplished by the force of the oral cavity and the human hand, and the aforementioned viscoelastic mud is used by the action such as squeezing, grinding, pinching, pulling, and the like. In order to comply with human use, it is necessary to control the viscosity, rebound rate, and tensile strength in a suitable range. The viscosity, rebound rate, and tensile strength are not as high as possible. Of course, they should not be too low. If they are too low or too high, they will lose their application function or application experience. If the viscosity is too weak, the wrapping of the filler is not strong and the filler is easy to be detached. If the viscosity is too strong, it will be too tight to be separated from the fingers when it comes into contact with a human hand. The viscosity is generally controlled between 8 and 24. If the rebound rate is too low, the feeling of use is that the viscoelastic mud is pressed to the end once it is pressed, that is, dead and dull, and lacking of feel. If the rebound rate is too high, the function of the viscoelastic mud cannot be reflected, and the shaping ability is reduced or lost. The rebound rate is generally controlled between 8% and 25%. If the tensile strength is too low, it is easy to loose and brittle. If the tensile strength is too high, the viscoelastic mud cannot be stretched out and is difficult to use. The tensile strength is generally controlled between 0.8 MPa and 3.4 MPa.

The viscosity of the viscoelastic mud of Examples 1 to 22 and Comparative Examples 1 to 3 can be tested in accordance with GB/T4852-2002 "Test Method for Tack of Pressure Sensitive Adhesive Tapes by Rolling Ball". The viscosity was represented by the initial adhesion of the rolling ball. This standard was that when a short contact occurred between the adhesive surface of the pressure sensitive adhesive tape and the object with a slight pressure, and the adhesive attraction of the adhesive tape to the object was called the initial adhesion. The viscoelastic mud was spread into a thin sheet to simulate a pressure sensitive adhesive tape for testing. The specific operation was as follows: at a temperature of 23° C., a steel ball was rolled over an adhesive surface of the viscoelastic mud which was placed flat on a 30 degrees inclined plate. The initial tack was evaluated according to the size of the largest steel ball to which the adhesive surface having the specified length of 100 mm could adhere. The numbers of the rolling ball with the largest diameter which stays for 5 seconds were recorded, the rolling ball ranged from 1.588 mm to 25.400 mm in diameter, representing the steel ball from No. 2 to No. 32. The initial adhesion was represented by the number of the largest steel ball that stays for 5 seconds.

The rebound rates of the viscoelastic mud of Examples 1 to 22 and Comparative Examples 1 to 3 can be tested in accordance with GB/T6670-2008 "Flexible Cellular Polymeric Materials-Determination of Resilience by Ball Rebound". At a temperature of 23° C., a steel ball having a mass of 16.8 g±1.5 g and a diameter of 16 mm was tested for ball rebound in a transparent tube having an inner diameter of 30 mm to 60 mm. The drop height was 500 mm±0.5 mm. The percentage of the bounced height to drop height of the steel ball was calculated, which was the rebound rate. Due to the viscosity of the surface of the viscoelastic mud, the rebound of the steel ball was affected. During the test, it is necessary to spray a layer of water film on the surface of the viscoelastic mud to eliminate the viscosity of the surface of the viscoelastic mud, thereby simulating and testing the rebound rate of the viscoelastic mud.

The tensile strengths of the viscoelastic mud of Examples 1 to 22 and Comparative Examples 1 to 3 were tested in accordance with ASTM D 412-1998. At a temperature of 23° C., the viscoelastic mud was made into a dumbbell shape, and two marking lines having a distance of 25 mm±0.25 mm were drawn on the dumbbell sample, and the testing speed of the tensile testing machine was 500 mm±50 mm/min, and the tensile strength was simulation tested.

The viscosity, rebound rates, and tensile strengths of the viscoelastic mud of Examples 1 to 22 and Comparative Examples 1 to 3 were shown in Table 2.

TABLE 2

| | Initial adhesion of rolling ball (Number of steel ball) | Rebound rate (%) | Tensile strength (MPa) |
|---|---|---|---|
| Example 1 | 8 | 21 | 2.2 |
| Example 2 | 15 | 18 | 1.8 |
| Example 3 | 10 | 12 | 2.9 |
| Example 4 | 12 | 19 | 2.1 |
| Example 5 | 17 | 16 | 2.2 |
| Example 6 | 11 | 11 | 3.0 |
| Example 7 | 14 | 15 | 2.6 |
| Example 8 | 20 | 18 | 1.2 |
| Example 9 | 19 | 17 | 1.1 |
| Example 10 | 21 | 21 | 0.8 |
| Example 11 | 23 | 16 | 1.2 |
| Example 12 | 22 | 18 | 2.5 |
| Example 13 | 23 | 12 | 3.4 |
| Example 14 | 23 | 9 | 0.9 |
| Example 15 | 21 | 10 | 1.1 |
| Example 16 | 13 | 15 | 0.8 |
| Example 17 | 11 | 25 | 3.4 |
| Example 18 | 21 | 11 | 1.2 |
| Example 19 | 15 | 11 | 1.9 |
| Example 20 | 24 | 8 | 0.8 |
| Example 21 | 18 | 12 | 1.3 |
| Example 22 | 16 | 14 | 1.8 |
| Comparative Example 1 | 30 | 3 | 0.2 |
| Comparative Example 2 | 4 | 32 | 0.4 |
| Comparative Example 3 | 3 | 37 | 4.6 |

As can be seen from Table 2, the initial adhesion of the viscoelastic mud of Examples 1 to 22 was No. 8 to No. 24. The initial adhesion of the viscoelastic mud of Examples 2 to 7 was No. 10 to No. 17, and the initial adhesion of the viscoelastic mud of Comparative Examples 1 to 3 was No. 30, No. 4 and No. 3, respectively. Obviously, the initial adhesion of the viscoelastic mud of Comparative Example 1 to 3 is either too low or too high, and the relatively low viscoelastic mud is not easy to wrap the filling material, and the relatively high viscoelastic mud tends to stick to the hand without falling off. The No. 3 steel ball was adhered to the surface by a ball of nearly 0.06 g without falling off, and the adhesion was too loose. The No. 30 steel ball was adhered to the surface by a ball of nearly 55 g without falling off, which will stick the fingers or the skin too tightly. The No. 8 steel ball was adhered to the surface by a ball of nearly 1 g without falling off, the No. 24 steel ball was adhered to the surface by a ball of nearly 28.5 g without falling off, the No. 10 steel ball was adhered to the surface by a ball of nearly 2 g without falling off, and the No. 17 steel ball was adhered to the surface by a ball of nearly 10 g without falling off, which all can wrap the filler and do not stick the fingers or the skin too tightly. In other words, the initial adhesion of the viscoelastic mud of Examples 1 to 22 was in a range suitable for human contact, and the filler can be effectively wrapped.

As can be seen from Table 2, the rebound rates of the viscoelastic mud of Examples 1 to 22 were 8% to 25%. The rebound rates of Examples 2 to 7 were 11% to 19%, and the rebound rates of Comparative Examples 1 to 3 were 3%, 32%, and 37%, respectively. Obviously, the rebound rates of the viscoelastic mud of Comparative Example 1 to 3 were either too low or too high. The feel of the viscoelastic mud with a rebound rate of 3% was dead, and the viscoelastic mud with a rebound rate of larger than 30% was quickly rebounded and deformed after being shaped, which lacked the function of shaping. The rebound rate was controlled between 8% and 25%, which was suitable for direct shaping and also suitable for shaping and tensioning fitness with other fillers. The application felt comfortable. The rebound rate of the Examples 2 to 7 was 11% to 19%, and the shaping function was more suitable.

As can be seen from Table 2, the tensile strengths of the viscoelastic mud of Examples 1 to 22 were 0.8 MPa to 3.4 MPa. The tensile strengths of Examples 2 to 7 were 1.8 MPa to 3.0 MPa, and the tensile strengths of Comparative Examples 1 to 3 were 0.2 MPa, 0.4 MPa, and 4.6 MPa, respectively. Obviously, the tensile strengths of the viscoelastic mud of Comparative Example 1 to 3 were also either too low or too high. The relatively low viscoelastic mud felt brittle and was difficult to wrap the filling material. The tensile strength of 4.6 MPa was difficult to use by human hand. The tensile strengths of Examples 1 to 22 were in a suitable range for the human body, had a good stretching force, and were also easy to use. The tensile strengths of Examples 2 to 7 were between 1.8 MPa and 3.0 MPa, and the tensile strength was moderate.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A viscoelastic mud, wherein the viscoelastic mud is produced from raw materials comprising: by weight percent, 4% to 20% of elastomer, 0% to 40% of softening oil, and 40% to 96% of liquid rubber; wherein the elastomer is at least one selected from the group consisting of styrene-ethylene-butylene-styrene block copolymer (SEBS), styrene-ethylene-propylene-styrene block copolymer (SEPS), and hydrogenated styrene-butadiene-isoprene-styrene block copolymer (SEEPS), the liquid rubber is at least one selected from the group consisting of nitrile butadiene rubber and butyl rubber.

2. The viscoelastic mud of claim 1, wherein the softening oil is at least one selected from the group consisting of paraffin oil and naphthenic oil.

3. The viscoelastic mud of claim 1, wherein the raw materials comprise: by weight percent, 8% to 15% of elastomer, 15% to 30% of softening oil, and 55% to 77% of liquid rubber.

4. A viscoelastic article, comprising a viscoelastic mud of claim 1.

5. The viscoelastic article of claim 4, wherein the viscoelastic article is selected from the group consisting of chewing gum, seaming glue, fitness gel, shaping mud, toys, handicrafts, and waterproof bags.

6. A method of preparing a viscoelastic mud, comprising:
weighing 4% to 20% by weight of elastomer, 0% to 40% by weight of softening oil, and 40% to 96% by weight of liquid rubber; wherein the elastomer is at least one selected from the group consisting of styrene-ethylene-butylene-styrene block copolymer (SEBS), styrene-ethylene-propylene-styrene block copolymer (SEPS), and hydrogenated styrene-butadiene-isoprene-styrene block copolymer (SEEPS), the liquid rubber is at least one selected from the group consisting of nitrile butadiene rubber and butyl rubber;
mixing the elastomer, the softening oil, and the liquid rubber at room temperature under continuous stirring to obtain a mixture; and
melting the mixture at a temperature of about 120° C. to about 220° C. to obtain the viscoelastic mud.

7. The method of claim 6, wherein the mixing the elastomer, the softening oil, and the liquid rubber at room temperature under continuous stirring comprises: mixing the softening oil and the liquid rubber uniformly under room temperature and continuous stirring, and then adding the elastomer to continuously mix for about 15 min to about 60 min.

8. The method of claim 6, wherein the mixing the elastomer, the softening oil, and the liquid rubber at room temperature under continuous stirring comprises: mixing the softening oil and the elastomer for about 15 min to about 60 min under room temperature and continuous stirring, and then adding the liquid rubber to continuously mix for about 15 min to about 60 min.

9. The method of claim 6, wherein the mixing the elastomer, the softening oil, and the liquid rubber at room temperature under continuous stirring comprises: mixing the liquid rubber and the elastomer for about 15 min to about 60 min under room temperature and continuous stirring, and then adding the softening oil to continuously mix for about 15 min to about 60 min.

10. The method of claim 6, wherein the softening oil is at least one selected from the group consisting of paraffin oil and naphthenic oil.

* * * * *